(12) United States Patent
Sofia

(10) Patent No.: US 10,223,030 B2
(45) Date of Patent: *Mar. 5, 2019

(54) SYNCHRONIZING A CURSOR BASED ON CONSUMER AND PRODUCER THROUGHPUTS

(71) Applicant: INTERNATIONAL BUSINESS MACHINES CORPORATION, Armonk, NY (US)

(72) Inventor: Anthony T. Sofia, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,216

(22) Filed: Apr. 4, 2018

(65) Prior Publication Data

US 2018/0225064 A1    Aug. 9, 2018

Related U.S. Application Data

(63) Continuation of application No. 15/052,994, filed on Feb. 25, 2016, now Pat. No. 9,965,219.

(51) Int. Cl.
*G06F 12/00*    (2006.01)
*G06F 3/06*    (2006.01)
(Continued)

(52) U.S. Cl.
CPC ............ *G06F 3/0656* (2013.01); *G06F 3/061* (2013.01); *G06F 3/0653* (2013.01);
(Continued)

(58) Field of Classification Search
CPC ..... G06F 5/10; G06F 5/06; G06F 5/12; G06F 5/14; H04L 49/50
See application file for complete search history.

(56) References Cited

U.S. PATENT DOCUMENTS 6,721,825 B1 *  4/2004  Wood ................. G06F 5/06
                                                    709/213
7,027,547 B1 *  4/2006  Hwang ............... H04L 25/05
                                                    375/372

(Continued)

OTHER PUBLICATIONS

List of IBM Patents or Patent Applications Treated as Related; (Appendix P), Filed Apr. 4, 2018; 2 pages.

*Primary Examiner* — David Yi
*Assistant Examiner* — Arvind Talukdar
(74) *Attorney, Agent, or Firm* — Cantor Colburn LLP; Teddi Maranzano

(57) ABSTRACT

A computer-implemented method includes writing, by a producer, data to one or more buffers. The one or more buffers include a plurality of cells and together form a circular buffer, and an input cursor indicates which cell of the plurality of cells the producer writes to. The method further includes reading, by a consumer, data from the one or more buffers, where an output cursor indicates which cell of the plurality of cells the consumer reads from. It is detected that the consumer is overrun by the producer. A throughput of the consumer is compared to a throughput of the producer, responsive to detecting that the consumer is overrun by the producer. The output cursor is synchronized to a new position, by a computer processor, where the new position is selected based on comparing the throughput of the consumer to the throughput of the producer.

18 Claims, 5 Drawing Sheets

(51) Int. Cl.
*G06F 5/00* (2006.01)
*G06F 5/06* (2006.01)

(52) U.S. Cl.
CPC .............. *G06F 3/0673* (2013.01); *G06F 5/00* (2013.01); *G06F 5/06* (2013.01)

(56) References Cited

U.S. PATENT DOCUMENTS

| | | | |
|---|---|---|---|
| 8,208,380 B1* | 6/2012 | Nachum | H04L 49/901 370/235 |
| 2002/0144010 A1* | 10/2002 | Younis | G06F 9/546 719/314 |
| 2002/0174273 A1* | 11/2002 | Castellano | G06F 5/06 710/29 |
| 2008/0043276 A1* | 2/2008 | Escott | G06F 5/14 358/1.15 |
| 2008/0098364 A1* | 4/2008 | Gray-Donald | G06F 11/3466 717/130 |
| 2016/0226655 A1* | 8/2016 | Mu | H04L 7/005 |
| 2017/0249101 A1 | 8/2017 | Sofia | |

* cited by examiner

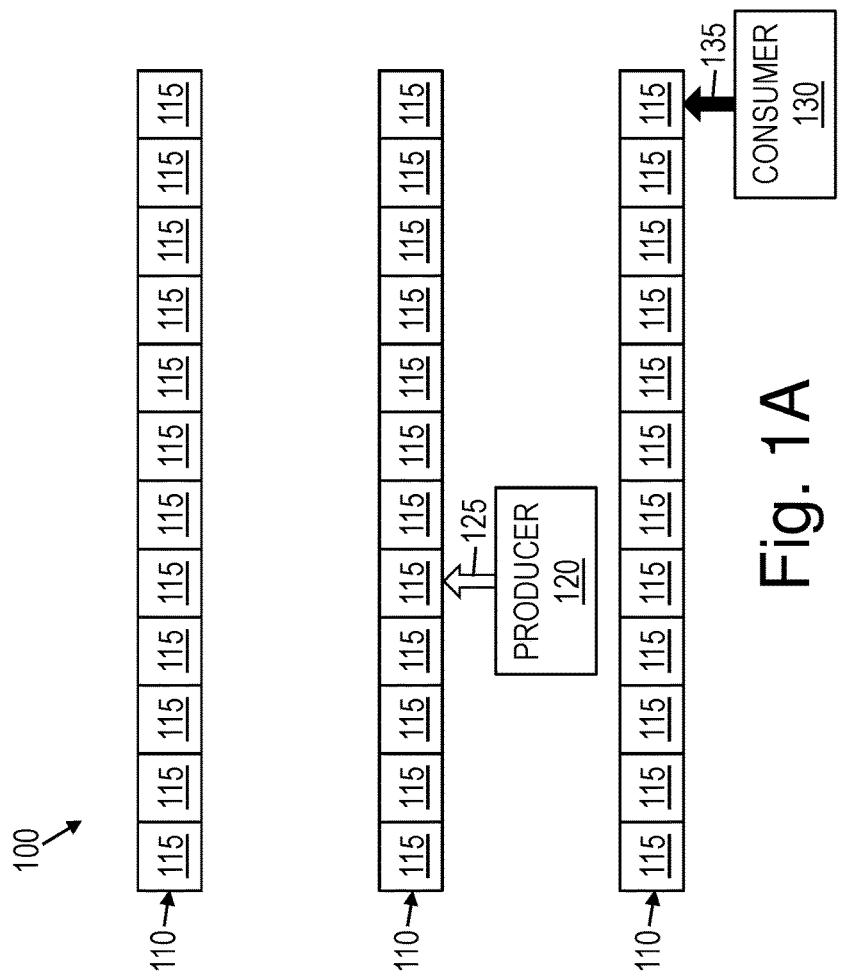

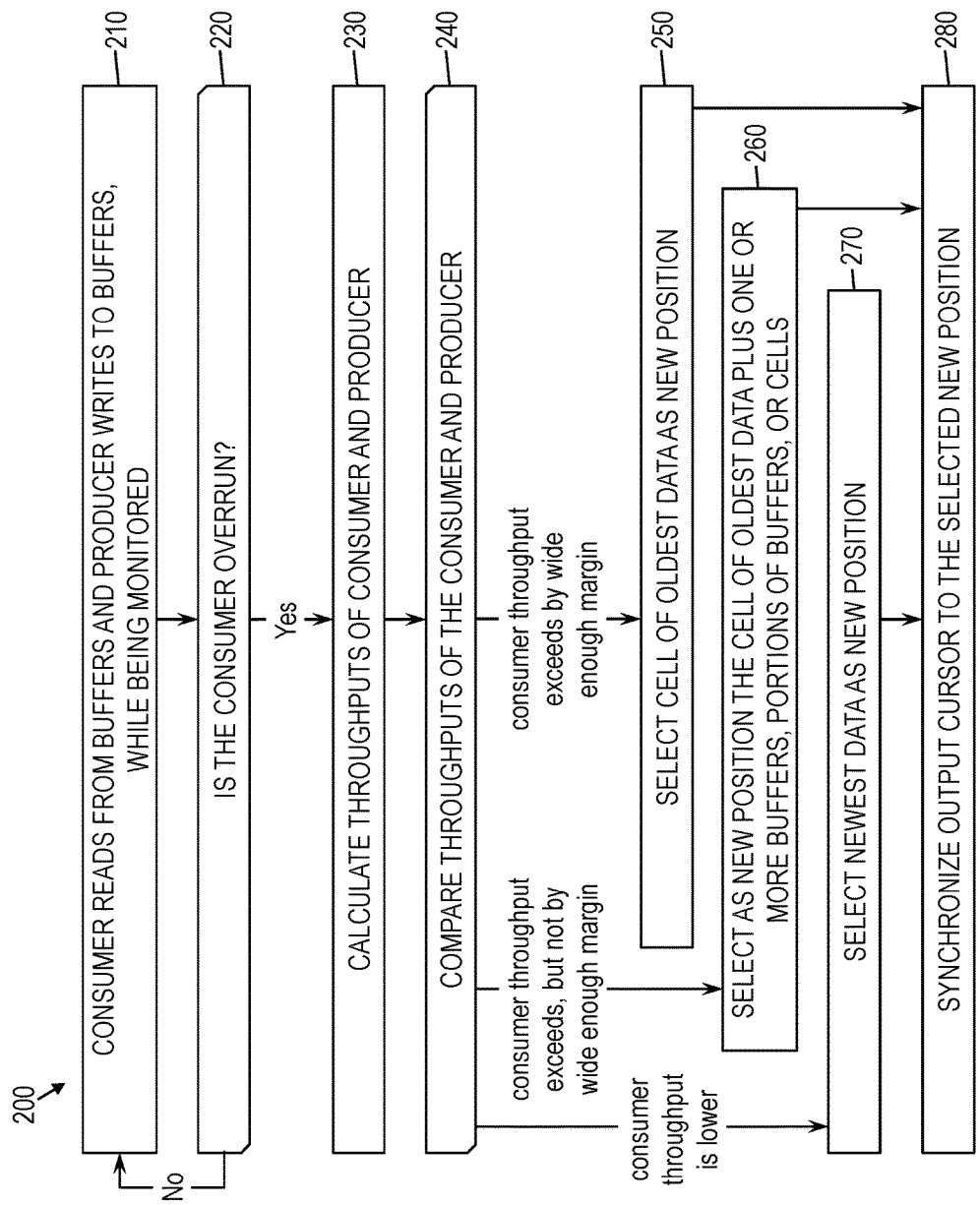

SYNCHRONIZING A CURSOR BASED ON CONSUMER AND PRODUCER THROUGHPUTS

PRIORITY

This application is a continuation of U.S. patent application Ser. No. 15/052,994, titled "SYNCHRONIZING A CURSOR BASED ON CONSUMER AND PRODUCER THROUGHPUTS," filed Feb. 25, 2016, the entire contents of which are incorporated herein by reference.

BACKGROUND

Embodiments of the present invention relate to data production and consumption and, more specifically, to synchronizing a cursor based on consumer and producer throughputs.

In a data streaming environment, each producer acts as a source of data to be processed, while each consumer processes the data provided by producers. In some cases, there may be multiple producers and multiple consumers. Each producer or consumer can have a unique data input or output rate, and there will be instances where a consumer becomes overrun with data due to differences among these rates.

In this case, a decision must be made. The consumer will restart processing data either with the oldest available data or with the newest available data. With the first option, the system of production and consumption is placing a premium on the oldest data, risking that the consumer may again become overrun with input. With the second option, the system is placing a premium on the newest data, dropping all historical information in the window between when the consumer was overrun and the current time.

SUMMARY

According to an embodiment of this disclosure, a computer-implemented method includes writing, by a producer, data to one or more buffers. The one or more buffers include a plurality of cells and together form a circular buffer, and an input cursor indicates which cell of the plurality of cells the producer writes to. The method further includes reading, by a consumer, data from the one or more buffers, where an output cursor indicates which cell of the plurality of cells the consumer reads from. It is detected that the consumer is overrun by the producer. A throughput of the consumer is compared to a throughput of the producer, responsive to detecting that the consumer is overrun by the producer. The output cursor is synchronized to a new position, by a computer processor, where the new position is selected based on comparing the throughput of the consumer to the throughput of the producer.

In another embodiment, a system includes a memory having computer readable instructions and one or more processors for executing the computer readable instructions. The computer readable instructions include writing, by a producer, data to one or more buffers. The one or more buffers include a plurality of cells and together form a circular buffer, and an input cursor indicates which cell of the plurality of cells the producer writes to. The computer readable instructions further include reading, by a consumer, data from the one or more buffers, where an output cursor indicates which cell of the plurality of cells the consumer reads from. It is detected that the consumer is overrun by the producer. A throughput of the consumer is compared to a throughput of the producer, responsive to detecting that the consumer is overrun by the producer. The output cursor is synchronized to a new position, where the new position is selected based on comparing the throughput of the consumer to the throughput of the producer.

In yet another embodiment, a computer program product for synchronizing an output cursor of a consumer includes a computer readable storage medium having program instructions embodied therewith. The program instructions are executable by a processor to cause the processor to perform a method. The method includes writing, by a producer, data to one or more buffers. The one or more buffers include a plurality of cells and together form a circular buffer, and an input cursor indicates which cell of the plurality of cells the producer writes to. The method further includes reading, by a consumer, data from the one or more buffers, where an output cursor indicates which cell of the plurality of cells the consumer reads from. It is detected that the consumer is overrun by the producer. A throughput of the consumer is compared to a throughput of the producer, responsive to detecting that the consumer is overrun by the producer. The output cursor is synchronized to a new position, where the new position is selected based on comparing the throughput of the consumer to the throughput of the producer.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

FIGS. 1A-1B are diagrams of a synchronization system, according to some embodiments of this disclosure;

FIG. 2 is a flow diagram of a method for synchronizing an output cursor associated with a consumer, according to some embodiments of this disclosure;

DETAILED DESCRIPTION

Various embodiments of this disclosure provide an improved synchronization method for streaming data. Rather than synchronize a consumer of data to the oldest or newest data available, some embodiments may consider the input rate and the output rate of data to determine a better synchronization location. As a result, applications using the data being processed by the consumers may experience fewer large data losses. Further, in some embodiments, data losses experienced may be old data rather than new data, which is an advantage over blind synchronization.

Figure 1B:
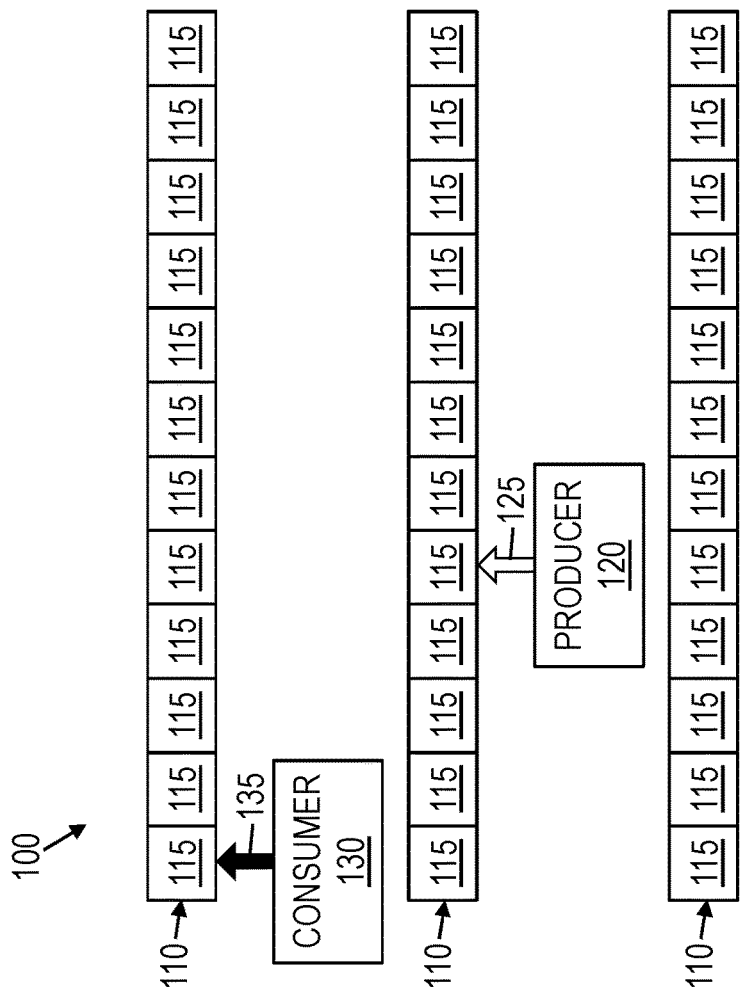

FIGS. 1A-1B are diagrams of a synchronization system 100, according to some embodiments of this disclosure. As shown, the synchronization system 100 may include one or more buffers 110, at least one input cursor 125 associated with at least one producer 120, and at least one output cursor 135 associated with at least one consumer 130. In some embodiments, there may be more than one input cursor 125 and more than one producer 120, and each input cursor 125 may be associated with a corresponding producer 120. Further, in some embodiments, there may be more than one output cursor 135 and more than one consumer 130, and each output cursor 135 may be associated with a corresponding consumer 130.

The one or more buffers 110 may maintain data, which may be written to the buffers 110 by the producer 120. The consumer 130 may obtain data from the buffers 110 and may process that data for use in an application or for output. For example, and not by way of limitation, the data may be frames of a streaming video, in which case the producer 120 may retrieve the data from a remote source and place it into the buffers 110, and the consumer 130 may obtain the data from the buffers 110 for display. For another example, the data may be information describing the performance of an operating system. In that case, the producer 120 may retrieve this data from a monitor of the operating system, and the consumer may view, report, or act on this data, such as to improve the performance of the operating system.

Each buffer 110 may include one or more cells 115, each configured to hold a unit of data, where the size of each unit may be implementation dependent. Each cursor, such as the input cursor 125 and the output cursor 135, may step through the cells 115 of the buffers 110. The input cursor 125 may determine where the producer 120 places its newest unit of data. For instance, the producer 120 may place a unit of data in the cell to which the input cursor 125 points, and then the input cursor 125 may be incremented to the next cell, indicating the next position at which the producer 120 may provide data. Analogously, the output cursor 135 may determine whether the consumer 130 reads data for processing. For instance, the consumer 130 may read a unit of data from the cell to which the output cursor 135 points, and then the output cursor 135 may be incremented to the next cell, indicating the next position at which the consumer 130 may read data.

The one or more buffers 110 may be ordered and may together form a circular buffer, such that each cursor, including the input cursor 125 and the output cursor 135, may wrap to the beginning of the first buffer 110 after having reached the end of the final buffer 110. FIG. 1A illustrates the output cursor 135 at the final cell 115 of the last buffer 110, with the input cursor 125 having already wrapped to the beginning of the buffers 110 and made further progress. FIG. 1B illustrates a point in time after FIG. 1A, where the output cursor 135 has wrapped back to the beginning of the first buffer 110.

Generally, the producer 120 may write data to the buffers 110 while the consumer 130 is reading data from the buffers 110. Thus, due to the circular nature of the buffers 110, it may be possible for the consumer 130 to catch up to the producer 120, or for the producer 120 to lap the consumer 130. If the consumer 130 catches up to the producer 120, then the consumer 130 may simply wait for the producer 120 to provide more data in the buffers 110, which the consumer 130 may then read.

In contrast, the producer 120 may overrun the consumer, which occurs when the producer 120 has written or is about it write to a cell 115 that has not yet been read by the consumer 130, after the producer wrote a unit of data to that cell. In other words, this case may occur when the input cursor 125 catches up to or passes the output cursor 135. Writing to such a cell 115 would result in discarding the data already stored in that cell 115, even though that data has not yet been read by the consumer 130. In these cases, the synchronization system 100 may determine where to position the output cursor 135 associated with the consumer 130 to reduce the loss of important data.

FIG. 2 is a flow diagram of a method 200 for synchronizing an output cursor 135 associated with a consumer 130, according to some embodiments of this disclosure.

As shown, at block 210, the consumer 130 may read data from the buffers 110, while the producer 120 may write data to the buffers 110, and the synchronization system 100 may monitor this reading and writing of data. In some embodiments, more specifically, this monitoring may be performed by monitoring the positions of the output cursor 135 and the input cursor 125, where the monitored movement of the output cursor 135 indicates the consumer's progress, and the monitored movement of the input cursor 125 indicates the producer's progress.

At decision block 220, it may be determined whether the consumer 130 is overrun. In some embodiments, this determination may be based on the positions of the output cursor 135 and the input cursor 125. If the consumer 130 is not overrun, then the method 200 may return to reading and writing at block 210.

In conventional systems, when the consumer 130 is overrun, it is often assumed that the consumer is operating at low throughput and will not be able to catch up (i.e., will not be able to read a predetermined portion of data in the buffers 110, such as all unread data, before being overrun again). While this may be the case, it may alternatively be the case that the consumer 130 does not always operate at a lower throughput than the producer 120. For instance, it may be the case that the consumer's throughput is typically able to keep up with the producer 120, but due to some external factor, there was a temporary slowdown that led to the consumer 130 being overrun. For another example, it may be the case that the producer's throughput was temporarily increased, leading the consumer 130 to fall be behind only temporarily.

Thus, as described further below, some embodiments of the synchronization system 100 may analyze the throughputs of the consumer 130 and the producer 120 to determine where to position, or synchronize, the output cursor 135. To this end, as also described below, the synchronization system 100 may dynamically assign the output cursor 135, and thus the consumer 130, to a cell of the buffers 110 that is deemed to suit the throughputs of both the consumer 130 and the producer 120. In this manner, the synchronization system 100 may reduce or minimize data loss.

At block 230, the synchronization system 100 may calculate the throughputs of the consumer 130 and the producer 120, which may be, respectively, the rates of movement of the output cursor 135 and the input cursor 125. These rates of movement may be based on the monitoring of the consumer's reading from the buffers 110 and the producer's writing to the buffers 110.

For example, and not by way of limitation, the throughput of the consumer 130 may be a historical throughput and may be defined as the rate at which the output cursor 135 has moved over a span of time as the consumer 130 reads data, and the throughput of the producer 120 may be a historical throughput and may be defined as the rate at which the input cursor 125 has moved over a span of time as the producer 120 writes data. In some embodiments, although the rate of each throughput may include historical data, it need not be the rate over the entire history of the consumer 130 or the producer 120. Rather, the rate may be defined based on only a recent span of time, where the length of that time may be configurable. In other words, the throughput of the consumer 130 may be a rolling average of the rate at which the consumer 130 reads data from the buffers 110 over a span of time, and the throughput of the producer 120 may be a rolling average of the rate at which the producer 120 writes data to the buffers 110 over a span of time.

At decision block 240, the throughputs of the consumer 130 and the producer 120 may be compared. A position of the output cursor 135 in the buffers 110 may be dynamically selected based on the comparison of the throughputs.

For instance, if it is determined that the consumer throughput exceeds the producer throughput by a wide enough margin that the consumer 130 would consume the entire used buffer space (i.e., all cells of the buffers 110 currently holding data not yet read by the consumer 130) before becoming overrun again, then at block 250, the position selected for the output cursor 135 may be the cell 115 of the oldest data in the buffers 110. In this case, it may be assumed that the consumer throughput was only temporarily low enough to cause the overrun at block 220, and the consumer 130 may still catch up.

If the consumer throughput is no less than the producer throughput, but does not exceed the producer throughput by a wide enough margin to catch up if placed at the oldest data (e.g., if the throughputs are the same), then at block 260, the position selected for the output cursor 135 may be the cell 115 of the oldest data plus the length of one or more cells 115, buffers 110, or portions of buffers 110. In other words, in this case, the synchronization system 100 may attempt to save some, but not all, of the old data. Further, in this case, the oldest data may be lost, as the output cursor 135 may be placed after the oldest data.

If the consumer throughput is less than the producer throughput, then at block 270, the position selected for the output cursor 135 may be the cell 115 of the newest data. In that case, it may be assumed that consumer 130 would fall farther and farther behind, and thus the synchronization system 100 may cut its losses rather than attempting to save older data.

For example, and not by way of limitation, the following table illustrates positions chosen for the output cursor 135 in one embodiment, given a buffer size of 1 GB. In this example, the position selected may be determined based on the buffer size, such that, when the position is determined relative to the position of the oldest data, the position is based on incrementing by an amount equal to the buffer size.

| Historical Producer Throughput | Historical Consumer Throughput | Buffer Size | Synchronization Position of Output Cursor |
|---|---|---|---|
| 10 MB/s | 1 MB/s | 1 GB | Newest data |
| 10 MB/s | 10 MB/s | 1 GB | Oldest data + 1 buffer (1 GB) |
| 10 MB/s | 20 MB/s | 1 GB | Oldest data |

At block 280, the output cursor 135 may be positioned at, or synced to, the position selected for it above. The method may then return to block 210, where reading and writing of data may continue, and monitoring of this reading and writing may continue.

Figure 3:
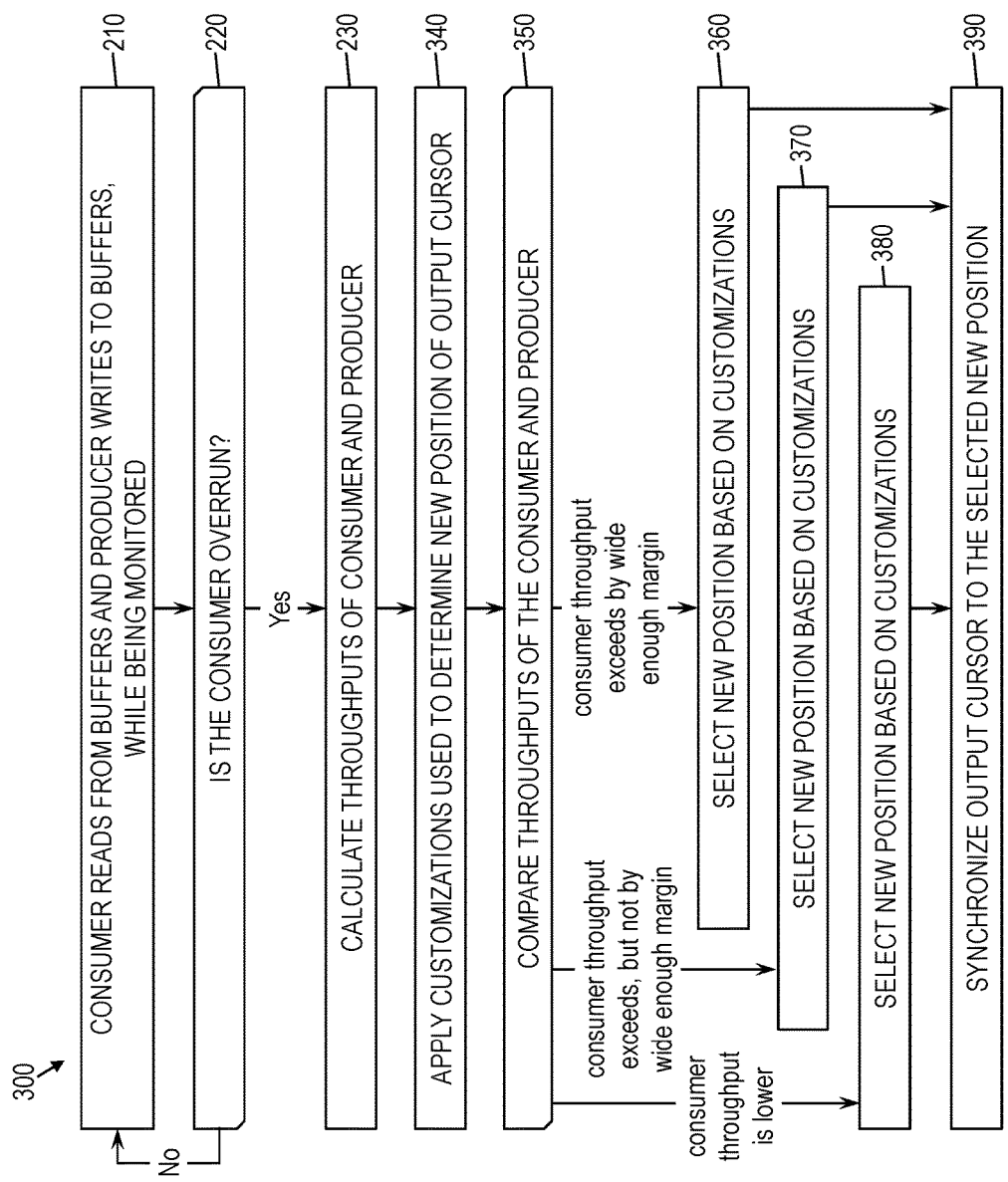
FIG. 3 is another flow diagram of a method for synchronizing an output cursor associated with a consumer, according to some embodiments of this disclosure.

FIG. 3 is another flow diagram of a method 300 for synchronizing an output cursor 135 associated with a consumer 130, according to some embodiments of this disclosure. As shown, the method 300 of FIG. 3 is similar to that of FIG. 2. Specifically, blocks 210 through 230 are the same in both figures.

However, as shown in FIG. 3, at block 340, the synchronization system 100 may customize one or more settings used to determine the new position of the output cursor 135 during synchronization.

This may be useful, for instance, in the case where an application for which the buffers 110 are used is time sensitive. In this case, the customizations may give high priority to newer data because the usefulness of older data may already have been lost. For instance, such a time-sensitive application may be real-time video streaming. In that case, repositioning the output cursor 135 to the newest data may be equivalent to jumping forward to a frame of the video that corresponds with data currently being received, such that the video plays in real time as intended.

In some embodiments, a user of the synchronization system 100 may provide configuration settings that are applied during the customization at block 350. These configuration settings may indicate a preference for older data or newer data, which may be considered when selecting a position for the output cursor 135. In some embodiments, however, the synchronization system 100 may detect the type of application involved and may prioritize older or newer data based on that type.

At block 350, the throughputs of the consumer 130 and the producer 120 may be compared. A position of the output cursor 135 in the buffers 110 may be dynamically selected based on the comparison of the throughputs.

At block 360, if it is determined that the consumer throughput exceeds the producer throughput by a wide enough margin that the consumer 130 would consume the entire used buffer space within a predetermined time frame, or at least before being overrun again, then at block 360, the position selected may be determined based on the customizations applied at block 350. For example, and not by way of limitation, even if the application involved is time-sensitive, the position selected for the output cursor 135 may be the oldest data, given that the consumer 130 may be expected to quickly catch up to the producer 120.

If the consumer throughput is no less than the producer throughput but does not exceed the producer throughput by the wide enough margin, then at block 370, the position selected for the output cursor 135 may be based on the customizations applied at block 350. For example, and not by way of limitation, if the application involved is time-sensitive, the position selected for the output cursor 135 may be the newest data, given that the consumer 130 may be expected to take an extended period of time to catch up, and newer data may be prioritized.

If the consumer throughput is less than the producer throughput, then at block 380, the position selected for the output cursor 135 may be based on the customizations applied at block 350. For example, and not by way of limitation, if the application involved is time-sensitive, the position selected for the output cursor 135 may be the newest data, given that the consumer 130 may not be expected to catch up, and newer data may be prioritized.

At block 390, the output cursor 135 may be positioned at, or synced to, the position selected for it above. The method may then return to block 210 of FIG. 3, where reading and writing of data may continue, and monitoring of this reading and writing may continue.

Figure 4:
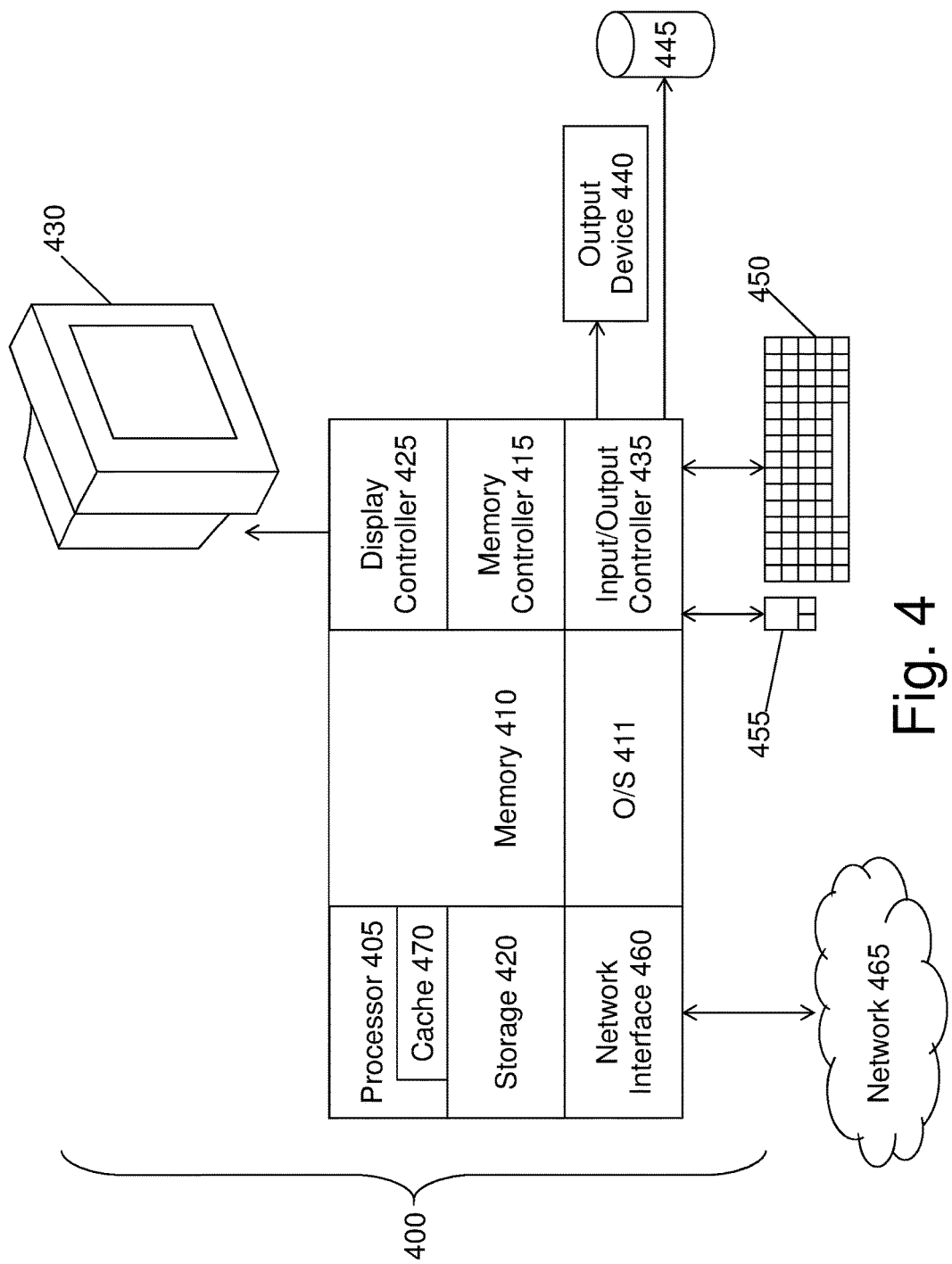
FIG. 4 is a block diagram of a computer system for implementing some or all aspects of the synchronization system, according to some embodiments of this disclosure.

FIG. 4 illustrates a block diagram of a computer system 400 for use in implementing a synchronization system 100 or method according to some embodiments. The synchronization systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For example, and not by way of limitation, the one or more buffers 110, the consumer 130, and the producer 120 may be implemented as hardware, software, or a combination thereof on a computer system 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the synchronization systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Synchronization systems 100 and methods according to this disclosure may be embodied, in whole or in part, in computer program products or in computer systems 400, such as that illustrated in FIG. 4.

Technical effects and benefits of some embodiments include the ability to dynamically and intelligently synchronize a consumer's output cursor 135 to reduce or minimize the loss of data when the consumer is overrun. This may be achieved by comparing the consumer's throughput to that of a producer providing the data and making a synchronization decision based on that comparison.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   writing, by a producer, data to one or more buffers, the one or more buffers comprising a plurality of cells and together forming a circular buffer, wherein a producer cursor indicates to which cell of the plurality of cells the producer writes;
   reading, by a consumer, data from the one or more buffers, wherein a consumer cursor indicates from which cell of the plurality of cells the consumer reads;
   detecting that the consumer is overrun by the producer on a first overrun occasion;
   responsive to detecting that the consumer is overrun by the producer on the first overrun occasion, determining that a consumer rate at which the consumer reads data from the circular buffer exceeds a producer rate at which the producer writes data to the circular buffer;
   responsive to detecting that the consumer is overrun by the producer on the first overrun occasion, determining a first margin by which the consumer rate exceeds the producer rate on the first overrun occasion;
   determining, based on the first margin by which the consumer rate exceeds the producer rate on the first overrun occasion, that the consumer will not read a second predetermined portion of unread data in the circular buffer before becoming overrun again;
   responsive to determining that the consumer will not read the second predetermined portion of unread data in the circular buffer before becoming overrun again:
      identifying an oldest cell comprising an oldest unit of data in the one or more buffers; and
      determining a second new position by incrementing from the oldest cell by at least a portion of the circular buffer; and
   synchronizing the consumer cursor to the second new position, responsive to the detecting that the consumer is overrun by the producer on the first overrun occasion.

2. The computer-implemented method of claim 1, further comprising:
   detecting that the consumer is overrun by the producer on a second overrun occasion;
   responsive to detecting that the consumer is overrun by the producer on the second overrun occasion, determining a second margin by which the consumer rate exceeds the producer rate on the second overrun occasion;
   determining, based on the second margin by which the consumer rate exceeds the producer rate on the second overrun occasion, that the consumer will read a second predetermined portion of unread data in the circular buffer before becoming overrun again;
   responsive to determining that the consumer will read the second predetermined portion of unread data in the circular buffer before becoming overrun again, selecting as a second new position a cell comprising an oldest unit of data in the circular buffer; and
   synchronizing, by a computer processor, the consumer cursor to the second new position, responsive to the detecting that the consumer is overrun by the producer on the second overrun occasion.

3. The computer-implemented method of claim 2, wherein the second new position is selected based at least in part on time-sensitivity of an application for which the writing and the reading is being performed.

4. The computer-implemented method of claim 1, further comprising:
   detecting that the consumer is overrun by the producer on a second overrun occasion;
   responsive to detecting that the consumer is overrun by the producer on the second overrun occasion, determining that the consumer rate is less than the producer rate;
   responsive to determining that the consumer rate is less than the producer rate, selecting as a second new position a cell comprising a newest unit of data in the circular buffer; and
   synchronizing the consumer cursor to the second new position, responsive to the detecting that the consumer is overrun by the producer on the second overrun occasion.

5. The computer-implemented method of claim 1, wherein the writing data to the one or more buffers comprises writing performance data associated with an operation of an operating system, wherein the reading data from the one or more buffers comprises reading the performance data associated with the operation of the operating system, and further comprising:
   analyzing the performance data for improvement of the operation of the operating system.

6. The computer-implemented method of claim 1, wherein the detecting that the consumer is overrun by the producer comprises detecting that the producer cursor has caught up with the consumer cursor.

7. A system comprising:
   a memory having computer readable instructions; and
   one or more processors for executing the computer readable instructions, the computer readable instructions comprising:
      writing, by a producer, data to one or more buffers, the one or more buffers comprising a plurality of cells and together forming a circular buffer, wherein a producer cursor indicates to which cell of the plurality of cells the producer writes;
      reading, by a consumer, data from the one or more buffers, wherein a consumer cursor indicates from which cell of the plurality of cells the consumer reads;
      detecting that the consumer is overrun by the producer on a first overrun occasion;
      responsive to detecting that the consumer is overrun by the producer on the first overrun occasion, determining that a consumer rate at which the consumer reads data from the circular buffer exceeds a producer rate at which the producer writes data to the circular buffer;
      responsive to detecting that the consumer is overrun by the producer on the first overrun occasion, determining a first margin by which the consumer rate exceeds the producer rate on the first overrun occasion;
      determining, based on the first margin by which the consumer rate exceeds the producer rate on the first overrun occasion, that the consumer will not read a first predetermined portion of unread data in the circular buffer before becoming overrun again;
      responsive to determining that the consumer will not read the first predetermined portion of unread data in the circular buffer before becoming overrun again:
         identifying an oldest cell comprising an oldest unit of data in the one or more buffers; and determining a first new position by incrementing from the oldest cell by at least a portion of the circular buffer; and synchronizing the consumer cursor to the first new position, responsive to the detecting that the consumer is overrun by the producer on the first overrun occasion.

8. The system of claim 7, the computer readable instructions further comprising:

detecting that the consumer is overrun by the producer on a second overrun occasion;

responsive to detecting that the consumer is overrun by the producer on the second overrun occasion, determining a second margin by which the consumer rate exceeds the producer rate on the second overrun occasion;

determining, based on the second margin by which the consumer rate exceeds the producer rate on the second overrun occasion, that the consumer will read a second predetermined portion of unread data in the circular buffer before becoming overrun again;

responsive to determining that the consumer will read the second predetermined portion of unread data in the circular buffer before becoming overrun again, selecting as a second new position a cell comprising an oldest unit of data in the circular buffer; and synchronizing the consumer cursor to the second new position, responsive to the detecting that the consumer is overrun by the producer on the second overrun occasion.

9. The system of claim 8, wherein the second new position is selected based at least in part on time-sensitivity of an application for which the writing and the reading is being performed.

10. The system of claim 7, the computer readable instructions further comprising:

detecting that the consumer is overrun by the producer on a second overrun occasion;

responsive to detecting that the consumer is overrun by the producer on the second overrun occasion, determining that the consumer rate is less than the producer rate;

responsive to determining that the consumer rate is less than the producer rate, selecting as a second new position a cell comprising a newest unit of data in the circular buffer; and synchronizing the consumer cursor to the second new position, responsive to the detecting that the consumer is overrun by the producer on the second overrun occasion.

11. The system of claim 7, wherein the writing data to the one or more buffers comprises writing performance data associated with an operation of an operating system, wherein the reading data from the one or more buffers comprises reading the performance data associated with the operation of the operating system, and the computer readable instructions further comprising:

analyzing the performance data for improvement of the operation of the operating system.

12. The system of claim 7, wherein the detecting that the consumer is overrun by the producer comprises detecting that the producer cursor has caught up with the consumer cursor.

13. A computer program product for synchronizing an output cursor of a consumer, the computer program product comprising a computer readable storage medium having program instructions embodied therewith, the program instructions executable by a processor to cause the processor to perform a method comprising:

writing, by a producer, data to one or more buffers, the one or more buffers comprising a plurality of cells and together forming a circular buffer, wherein a producer cursor indicates to which cell of the plurality of cells the producer writes;

reading, by a consumer, data from the one or more buffers, wherein a consumer cursor indicates from which cell of the plurality of cells the consumer reads;

detecting that the consumer is overrun by the producer on a first overrun occasion;

responsive to detecting that the consumer is overrun by the producer on the first overrun occasion, determining that a consumer rate at which the consumer reads data from the circular buffer exceeds a producer rate at which the producer writes data to the circular buffer;

responsive to detecting that the consumer is overrun by the producer on the first overrun occasion, determining a first margin by which the consumer rate exceeds the producer rate on the first overrun occasion;

determining, based on the first margin by which the consumer rate exceeds the producer rate on the first overrun occasion, that the consumer will not read a first predetermined portion of unread data in the circular buffer before becoming overrun again;

responsive to determining that the consumer will not read the first predetermined portion of unread data in the circular buffer before becoming overrun again:

identifying an oldest cell comprising an oldest unit of data in the one or more buffers; and determining a first new position by incrementing from the oldest cell by at least a portion of the circular buffer; and synchronizing the consumer cursor to the first new position, responsive to the detecting that the consumer is overrun by the producer on the first overrun occasion.

14. The computer program product of claim 13, the method further comprising:

detecting that the consumer is overrun by the producer on a second overrun occasion;

responsive to detecting that the consumer is overrun by the producer on the second overrun occasion, determining a second margin by which the consumer rate exceeds the producer rate on the second overrun occasion;

determining, based on the second margin by which the consumer rate exceeds the producer rate on the second overrun occasion, that the consumer will read a second predetermined portion of unread data in the circular buffer before becoming overrun again;

responsive to determining that the consumer will read the second predetermined portion of unread data in the circular buffer before becoming overrun again, selecting as a second new position a cell comprising an oldest unit of data in the circular buffer; and synchronizing the consumer cursor to the second new position, responsive to the detecting that the consumer is overrun by the producer on the second overrun occasion.

15. The computer program product of claim 14, wherein the second new position is selected based at least in part on time-sensitivity of an application for which the writing and the reading is being performed.

16. The computer program product of claim 13, the method further comprising:

detecting that the consumer is overrun by the producer on a second overrun occasion;

responsive to detecting that the consumer is overrun by the producer on the second overrun occasion, determining that the consumer rate is less than the producer rate;

responsive to determining that the consumer rate is less than the producer rate, selecting as a second new position a cell comprising a newest unit of data in the circular buffer; and synchronizing the consumer cursor to the second new position, responsive to the detecting that the consumer is overrun by the producer on the second overrun occasion.

17. The computer program product of claim 13, wherein the writing data to the one or more buffers comprises writing performance data associated with an operation of an operating system, wherein the reading data from the one or more buffers comprises reading the performance data associated with the operation of the operating system, and the method further comprising:

analyzing the performance data for improvement of the operation of the operating system.

18. The computer program product of claim 13, wherein the detecting that the consumer is overrun by the producer comprises detecting that the producer cursor has caught up with the consumer cursor.

\* \* \* \* \*